US005670120A

United States Patent [19]

Degenhardt et al.

[11] Patent Number: 5,670,120

[45] Date of Patent: Sep. 23, 1997

[54] SYSTEM FOR INCUBATING SAMPLE LIQUIDS

[75] Inventors: Volker Degenhardt, Bensheim; Manfred Böhm, Mannheim; Alois Rainer, München; Albert Wohland, Viernheim, all of Germany

[73] Assignee: Boehringer Mannheim GmbH, Mannheim, Germany

[21] Appl. No.: 555,428

[22] Filed: Nov. 9, 1995

[30] Foreign Application Priority Data

Nov. 11, 1994 [DE] Germany .......................... 44 40 294.5

[51] Int. Cl.$^6$ ............................... B01L 7/00; G01N 35/00

[52] U.S. Cl. .............................. 422/104; 422/63; 422/64; 422/102; 436/43; 436/174; 436/807; 436/809; 436/810; 435/809

[58] Field of Search ............................... 422/63, 64, 102, 422/104; 436/43, 174, 180, 807, 809, 810; 435/880

[56] References Cited

U.S. PATENT DOCUMENTS

| | | | |
|---|---|---|---|
| 3,556,731 | 1/1971 | Martin | 422/102 |
| 3,847,200 | 11/1974 | Kopp et al. . | |
| 3,964,867 | 6/1976 | Berry | 422/64 |
| 4,310,488 | 1/1982 | Rahm et al. | 422/102 |
| 4,335,620 | 6/1982 | Adams | 73/863.11 |
| 4,950,608 | 8/1990 | Kishimoto | 435/290 |
| 5,073,346 | 12/1991 | Partanen et al. | 422/99 |
| 5,271,896 | 12/1993 | Jakubowicz et al. . | |
| 5,282,543 | 2/1994 | Picozza et al. | 220/255 |

FOREIGN PATENT DOCUMENTS

| | | |
|---|---|---|
| 0 369 840 A1 | 5/1990 | European Pat. Off. . |
| 0 488 769 A3 | 6/1992 | European Pat. Off. . |
| 0 642 828 A1 | 3/1995 | European Pat. Off. . |
| 88 04 938.8 | 7/1988 | Germany . |

*Primary Examiner*—Long V. Le
*Attorney, Agent, or Firm*—Nikaido, Marmelstein, Murray & Oram LLP

[57] ABSTRACT

A system for incubating sample liquids is proposed where the incubating vessels are placed into the bores of an incubator block with the aid of a rack. The rack has bores in which the incubating vessels are hanging. The bores of the rack and the ones in the incubator block are adjusted to one another so that the incubating vessels fit into the bores of the incubator block when the rack is placed onto the incubator block.

14 Claims, 3 Drawing Sheets

Figure 1A:
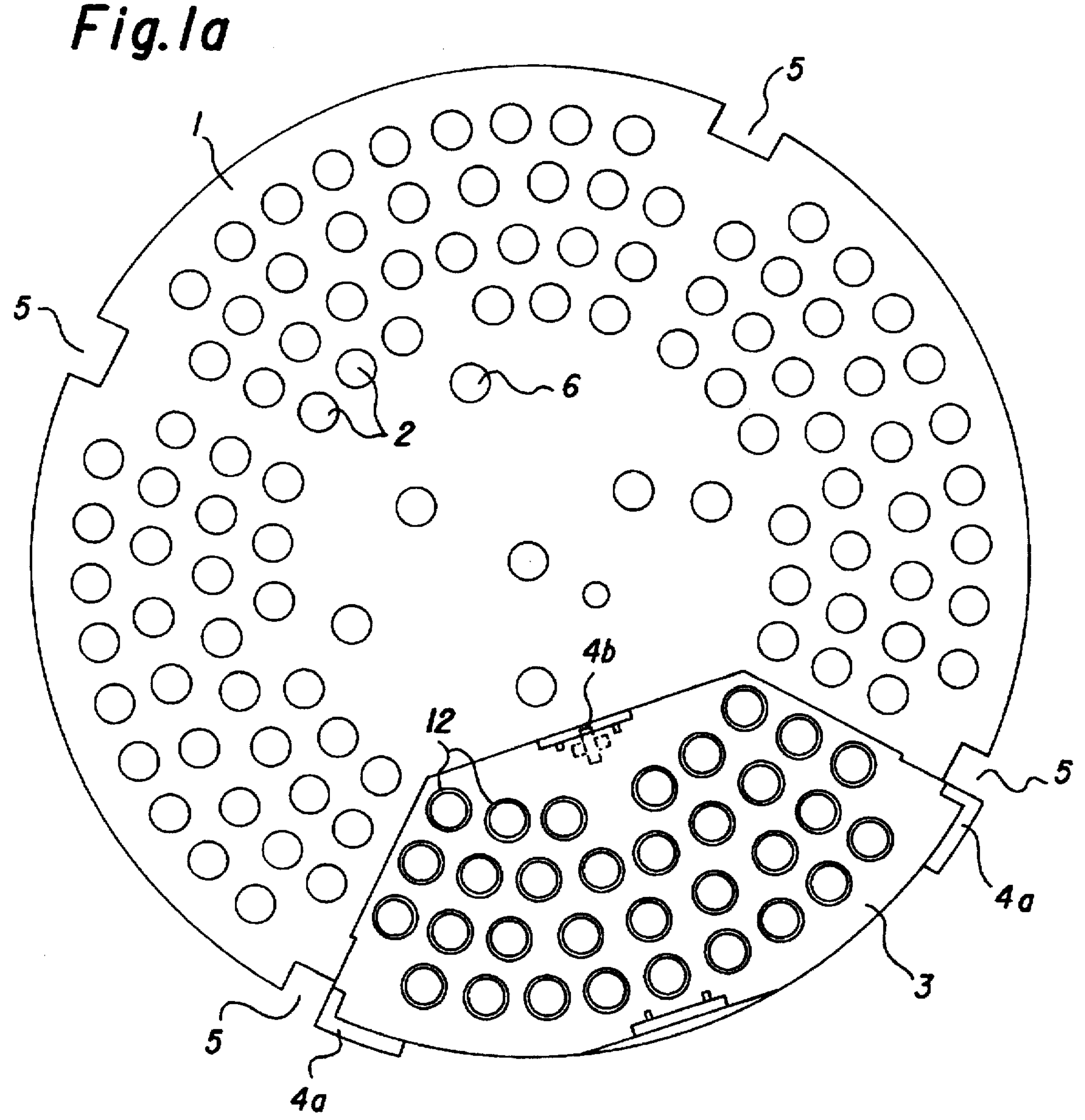

Fig.4a
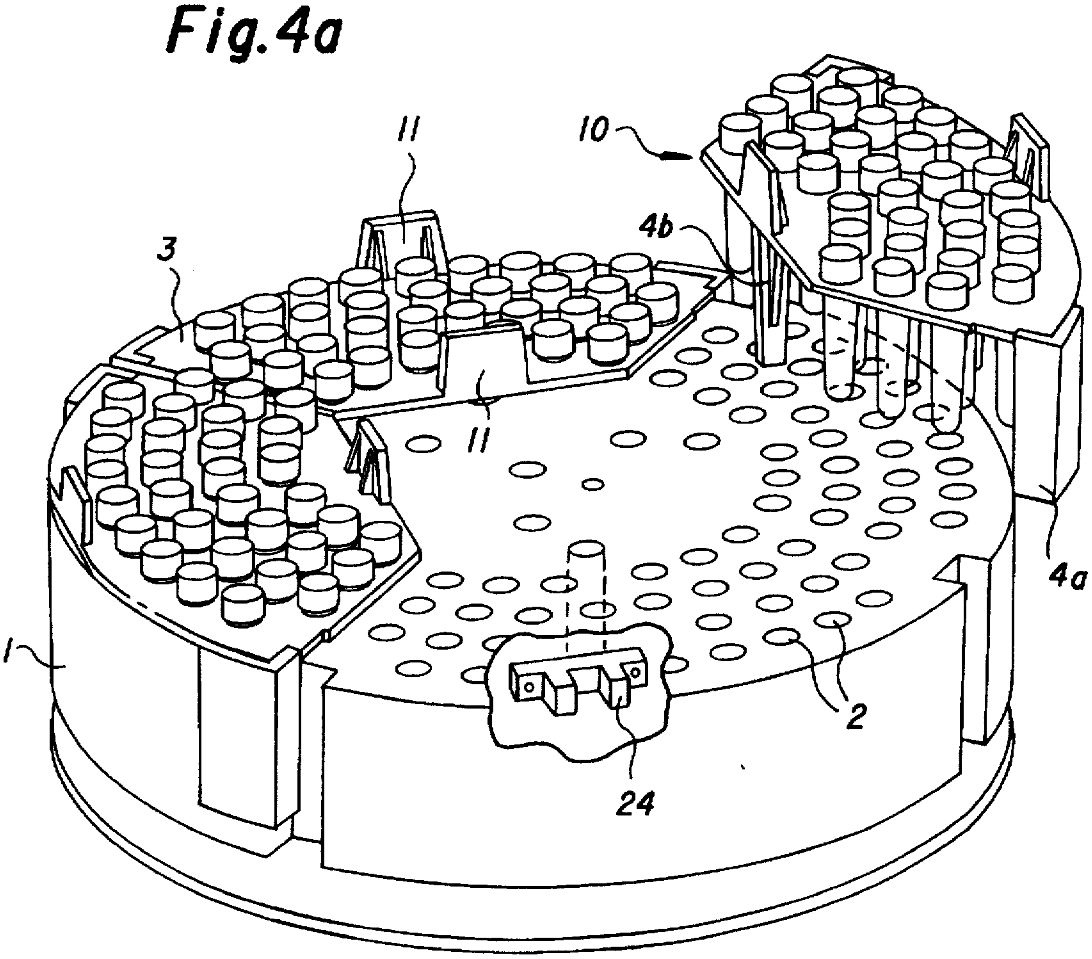
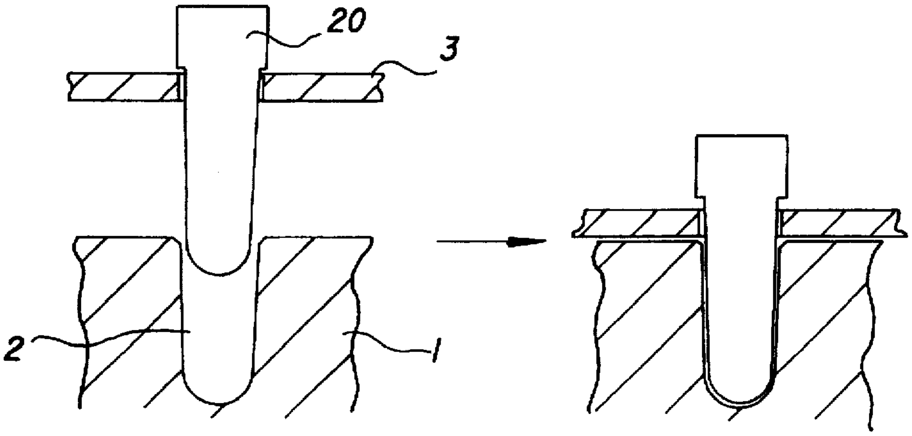
Fig.4b

SYSTEM FOR INCUBATING SAMPLE LIQUIDS

SYSTEM FOR INCUBATING SAMPLE LIQUIDS

The present invention relates to a novel system for incubating sample liquids, comprising the following elements:

- a rack where incubating vessels are hanging in the bores of a holding plate,
- an incubator block with bores to receive incubating vessels,
- a device for thermostatting the incubator block, said device being thermally linked to the incubator block, wherein bores in the holding plate and the bores in the incubator block are adjusted to one another such that the incubating vessels of the rack fit into the bores of the incubator block when the rack is placed on the incubator block.

Systems for incubating sample liquids are used in particular in the field of clinical diagnostics. The implementation of many a diagnostic method requires that reactions be carried out at a given temperature in order to be able to control the reaction rate. Incubating sample liquids is, however, not exclusively used for carrying out analytical reactions. Incubators are also used to replicate organisms such as bacteria, yeasts, fungi, viruses, etc. in sample liquids in order to subsequently determine these replicated organisms. Incubators are, for example, also used to amplify DNA or RNA. The instruments used for this purpose are known as thermocycler.

Instruments for incubating sample liquids have been known for a long time in prior art. Available instruments can principally be divided into 2 classes. The first class is made up of incubators where the sample vessels are heated up by means of a fluid phase. Devices of this type are described in EP-A-0 363 143 and EP-B 0 087 028, for example. These two documents describe devices where the sample vessels are held in a holding device and immersed into a liquid together with said holding device. The temperature of the sample vessels and sample liquids is controlled by means of the liquid provided in the incubator. As a consequence of the fluid properties of the liquid phase, the liquid perfectly matches the form of the incubating vessels.

The second class of incubating devices covers so-called metal block incubators where bores to receive incubating vessels are provided within an incubator block that is made of a thermally conductive material. Such incubating devices are described in EP-A-0 151 781 or U.S. Pat. No. 4,335,620, for example. This application refers to the entire contents of these two documents.

U.S. Pat. No. 4,335,620 describes an incubator having a solid block made of a heat conductive material such as aluminum. The block serves to receive sample vessels and also as a heat sink to control the temperature of the vessels. The document refers in particular to a special design for thermally insulating the device with respect to the environment. This reduces the total thermal loss of the apparatus.

Document U.S. Pat. No. 4,727,034 concerns a device for thermostatting sample liquids. The vessels with the sample liquids are placed into a rack of a thermally well conductive material. The rack in turn is placed between the two lateral walls of a device where it is fixed in its position. At least one of these lateral walls is heated thus allowing a temperature control of the rack and, hence, of the sample liquids in the vessels.

Each of the two above listed classes of incubators has its advantages and drawbacks. When fluids are used to transfer heat, it is necessary to use an arrangement of contiguous incubating vessels. It is thus possible to immerse several vessels simultaneously into a heat bath. A disadvantage of this type of incubator is that the fluids adhere to the outer walls of the incubating vessels. When said incubating vessels are taken out of the liquid, e.g. for further processing, liquid may drop down and contaminate the instrument. An even greater disadvantage is if the liquid adhering to the vessel or the incubator is splashed which may interfere with the analysis. All in all, the handling of wet reagent vessels is disadvantageous and should, hence, be avoided.

Metal block incubators do not have these disadvantages, but have in turn their own drawbacks. In order to ensure good heat conduction between sample liquid and incubator, it must ensured that the incubating vessels be brought into direct contact with the incubator so that the joined surface is as large as possible which then ensures good heat conduction. The incubators described in U.S. Pat. No. 4,335,620 and U.S. Pat. No. 4,727,032 fulfill this requirement in that the device in the incubator has bores which match the form of the incubating vessels. The reagent vessels and the bores in the incubators must, hence, exactly match. Owing to the mechanical conditions, it has to date not been possible to insert an arrangement consisting of several vessels in a metal block incubator without jamming.

It is an object of this invention to eliminate this drawback of metal block incubators and to provide an incubating device which combines the advantages of metal block incubators and fluid incubators. It was a particular object of the invention to provide a system of incubation which does not require the use of fluid to transfer heat and allows simple, rapid, and reliable loading of incubators with numerous incubating vessels.

This object is accomplished by means of a system for incubating sample liquids which comprises the following elements:

- a rack where incubating vessels are hanging in the bores of a holding plate.
- an incubator block with bores to receive incubating vessels.
- a device for thermostatting the incubator block, said device being thermally linked to the incubator block, wherein bores in the holding plate and the bores in the incubator block are adjusted to one another such that the incubating vessels of the rack fit into the bores of the incubator block when the rack is placed on the incubator block.

Sample liquids for incubation are understood to be blood samples, serum samples, urine, food samples, water samples, reaction mixtures and the like. The term covers especially those liquids that are obtained from sample materials by adding reagents. It covers also DNA-containing samples to which reagents are added in order to amplify the DNA.

A system in accordance with the invention can be used in particular for the chemical and clinical-chemical analysis as maintaining certain temperatures and/or pretreatment of samples at certain temperatures is of decisive importance to the reliability of the result in this field of application. An incubating system in accordance with the invention can also be used as a so-called thermocycler that is used to amplify DNA.

The term incubation refers to controlling the temperature of sample liquids over a given period of time at a given temperature profile. In the most frequently used incubators, the incubator block has an exactly defined temperature which is maintained constant over an extended period of time. In this case, incubation is started by placing the incubating vessel into an incubator block and terminated by taking said incubating vessel out of said block. The invention also proposes a time-related control of the temperature of the incubator block. It is thus possible to expose the sample liquid to changing temperatures while the incubation vessel is present in the incubator block. Time-related temperature profiles are used in so-called thermocyclers to amplify DNA by means of PCR (polymerase chain reaction).

A system for incubating sample liquids as understood by the invention is a so-called stand-alone module or a module within an analyzer. The term incubator block refers to the part of the incubation system which features the bores to receive the incubating vessels. Incubators in accordance with the invention are, hence, part of the class of metal block incubators. In a preferred manner, this incubator block is manufactured as one single piece, e.g. a cylinder in which the bores are provided or, is obtained by moulding a material in a form where recesses for incubation vessels are already provided. Suitable materials for the incubator block are metals, especially aluminum, but also alloys such as brass.

The bores in the incubator block usually have a cylindrical shape, or the shape of truncated cones. The term "cylinder" in accordance with the present invention refers to both cylinders with a round cross section as well as cylinders with a squared cross section. The bores usually have a depth of a few centimeters and are preferably tapered toward the inside of the incubator block.

Moreover, the incubator block may also be provided with guiding elements to facilitate the positioning of the rack in accordance with the invention. Sensors (e.g. light barriers) may be provided inside the incubator block or at the outside thereof to detect the presence of a rack.

The incubator block is also in thermal contact with the thermostatting device. If the incubator block is provided exclusively for heating up incubation vessels to above room temperature, this thermostatting device can be a simple electrical heater. However, it is advantageous to provide a possibility for cooling the incubator block in addition to the heating element. Cooling can be achieved, for example, in that a part of the incubator block has cold water flowing through it. When larger incubation systems are used, it is possible to provide a refrigerator for cooling. Devices that allow both heating and cooling are Peltier elements which transport heat by means of electrical energy.

The above described device for controlling the temperature of an incubator block can either be thermally linked to the incubator block as is described in U.S. Pat. No. 4,335,620, or the means for controlling the temperature can be provided inside the incubator block itself.

Temperature sensors to control the setting of the desired temperature can be provided inside the incubator block preferably in the vicinity of the bores for the incubation vessels. The control unit for the thermostatting device is commonly known in prior art. For description of a thermostatting control unit, reference is made to the full contents of EP-B-0 273 969.

The incubator block has a number of bores that are open toward the top. These bores are usually periodically arranged. In prior art, these bores are loaded with incubating vessel either manually or with the aid of a robot arm. While manual loading is time and staff intensive, a device for automatically loading an instrument is relatively complex and expensive. Even when incubation vessels are automatically loaded into the instrument, it is necessary that they are provided in a suitable arrangement for the robot unit.

In the present invention, the incubator block is loaded with vessels with the aid of a rack holding said vessels. In accordance with the invention, the incubating vessels are held in the bores of a holding plate. The bores in said holding plate are arranged corresponding to the bores inside the incubator block. When the incubator block is loaded with incubation vessels, the rack is moved across the incubator block and lowered so that the incubation vessels move into the bores of the incubator block.

A holding plate in accordance with the invention has the form of a thin disk in which provision is made for bores to receive incubating vessels. The holding plate can be made of numerous form stable materials. In practical use, metals and especially plastics are often used. The arrangement of the bores in a holding plate corresponds to the arrangement of the bores at the top side of the incubator block used. A holding plate cart, for example, be a full circle or, preferably, a circular segment or a segment of a circular disk. The thickness of the holding plate must be dimensioned so as to ensure mechanical stability when incubating vessels are held in the holding plate. If the holding plate is made of plastic, the thickness of the material will usually range between one and several millimeters. It is, of course, also possible to reduce the thickness of the material if reinforcements are included to increase the mechanical stability.

If the holding plate is made of a solid piece of material, the bores can be provided with the aid of tools, or they can also be provided during manufacture of the holding plate. In accordance with the invention, the cross section of these bores is of some importance so that the tolerances for the cross section of the bores should not exceed 0.05 mm.

When selecting materials for the holding plate, it is preferred to use materials with poor heat-conductive properties as a preferred embodiment of the invention proposes that the holding plate rest directly on the incubator block. Holding plates with poor heat-conductive properties reduce, hence, the loss of heat of the incubator block to the environment.

At the lower side of the holding plate, it is preferred to provide legs to ensure that the incubating vessels hanging in the holding plate do not touch the support on which the unit stands. Because of these legs, the holding plate can also be used as frame-type support in which incubating vessels can also be stored outside an incubating instrument. This is of particular importance if the holding plate is already loaded with incubating vessels during manufacture. In this case, the legs facilitate packing of the holding plate with the incubating vessels and also account for a more convenient handling by the user.

The top side of the holding plate can be provided with handles for the user to transport the rack. The handles are particularly useful to insert the rack into the incubator block as it would be inconvenient to handle the holding plate itself.

It is preferred to insert incubating vessels into the bores of the holding plate already during manufacture. However, it is also possible for the user to manually load the holding plate with incubating vessels. Incubating vessels are commonly known in prior art. Multiple-use incubating vessels are usually made of glass while disposable vessels are usually made of a plastic material. Suitable plastics include polyethylene, polypropylene, polystyrene, and polymethyl metacrylate. The form of the incubating vessels usually corresponds to the one of a tube with one open and one closed end. As already described further above, it is critical to the use of incubating vessels and incubator blocks with bores that the outside of the incubating vessels rest at the inner wall of the bores to ensure good heat conduction.

Preferred incubating vessels are tubes that are tapered towards their closed end, i.e. towards their bottom side. Experience has shown that a tapering with a gradient of 0.05–0.5 is particularly favorable for manufacturing reasons. In accordance with the invention, the incubating vessels also have holding devices to prevent slipping of the incubating vessels through the bores in the holding plate. The incubating vessels are hanging in the holding plate with their closed end facing downward. Holding of the incubating vessels is possible if the vessels are tapered with the open end having a cross section that is larger than the cross section of a bore of the holding plate. If such an incubating vessel is inserted into a bore, it will slip down until it reaches a position where the external cross section corresponds to the cross section of the bore. The incubating vessel will remain at this position as it is no longer able to move further downward.

In accordance with the invention it is preferred that the incubating vessel be provided with holding elements for a more exactly defined holding position of the incubating vessel in the holding plate. These holding elements can, for example, be cross bars that are attached to the circumference of the incubating vessel and enlarge the effective cross section of the incubating vessel at a given height. It is particularly preferred if the incubating vessel is designed so as to have a shoulder which runs essentially perpendicular to the longitudinal axis of the incubating vessel. With this shoulder, the incubating vessels rests on the holding plate. Such an element can be generated, for example, by providing a circular ring running around the incubating vessel; or the incubating vessel can be provided with a lower portion whose cross section is smaller than the cross section of the bores; this portion is provided with a second portion whose cross section is larger than the cross section of the bore. In a preferred manner, both portions are connected perpendicularly to the longitudinal axis of the incubating vessel by means of a piece of material. This connecting piece forms a shoulder which rests on the holding plate.

A critical factor in accordance with the invention is the ratio of the cross section of the bore and the outer circumference of the incubation vessel which is on one level with the holding plate once the incubating vessel is placed in the holding plate. On the one hand, the incubating vessel must be held by the holding plate in a sufficiently exact manner on the shoulder of the holding plate so as to allow accurate insertion of the incubating vessels into the bores of the incubator block. On the other hand, the incubating vessel must have a certain tolerance in the bore on the level of the shoulder of the holding plate so that geometric deviations of the bores in the holding plate and the bores in the incubator block do not cause the incubating vessels to be jammed. Mechanical tolerance between incubating vessels and holding plate is of particular importance for incubators because temperature differences lead to heat-dependent expansion. This in turn may cause jamming in the rigid arrangement of incubating vessels and holding plate if more than one incubating vessel is used. Already minor jamming may interfere with the tight fitting of the incubating vessels with the inner walls of the bores of the incubator block.

Suitable mechanical tolerance is achieved if the outer cross section of the incubating vessel in the area that is surrounded by the holding plate is by 0.2 to 1 mm smaller than the inner cross section of the bores of the holding plate.

In order to ensure that an incubating vessel fits tightly with a bore, it is also advantageous if the one part of the incubating vessel that is below the holding plate is longer than the depth of the bores of the incubator block. If the holding plate with the incubating vessels is placed onto the incubator block the incubating vessels make contact with the bottom of the bores and the holding elements of the vessels are lifted up from the holding plate. When tapered incubating vessels are used, this increases the tolerance between incubating vessels and bore in the holding plate and jamming is further prevented. In this embodiment, it is advantageous if the holding devices of the incubator vessel are lifted up from the holding plate. This ensures that the incubating vessels still fits tightly with the inner walls of the bore even if the incubating vessels deviate in length due to manufacturing shortcomings.

In a particularly preferred embodiment of the subject matter of the invention, the holding plate is already loaded with incubating vessels so that the user only has to insert it in the incubator block.

It is, therefore, an advantage of the invention that the rack in accordance with the invention allows simple loading of incubators. The advantages of fluid incubators and metal block incubators can, hence, be combined by using a rack in accordance with the invention. The invention allows simple loading of an incubator with numerous incubating vessels without requiring numerous manual operating steps, a robot system, or involving the disadvantages brought about by using fluids.

The figures explain the present invention in greater details:

FIG. 1*a*: top view of an incubator block with an inserted rack

Figure 1B:
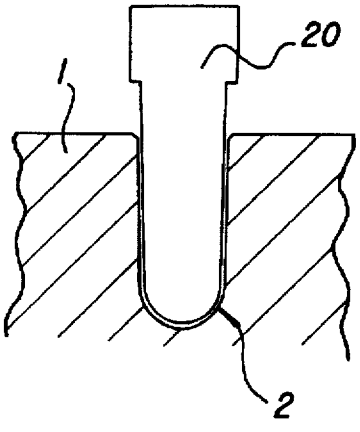

FIG. 1*b*: partial section of FIG. 1*a* in a lateral view

Figure 2:
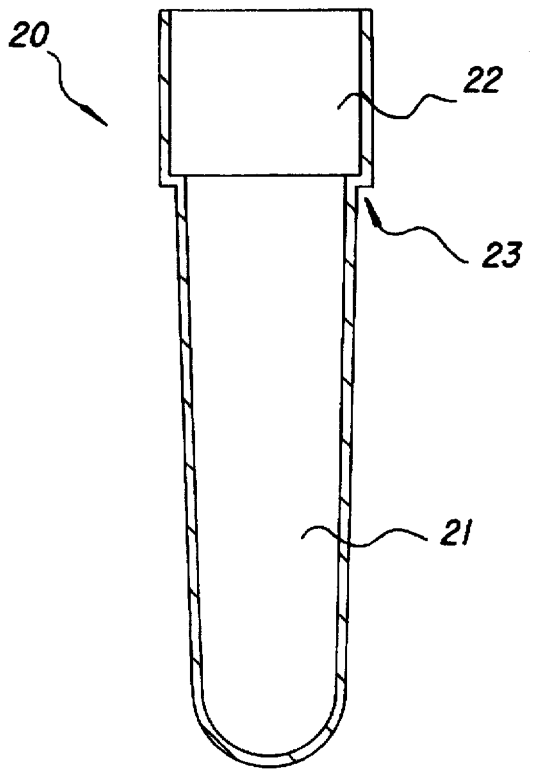

FIG. 2: incubating vessel

Figure 3:
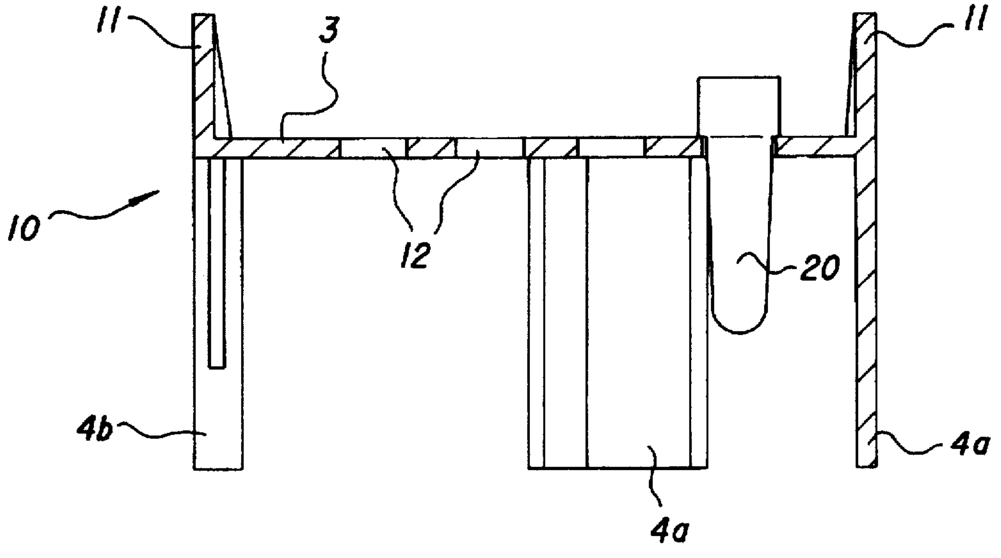

FIG. 3: lateral view of a rack

FIG. 4*a*: perspective representation of a partially loaded incubator block

FIG. 4*b*: schematic drawing of the loading procedure

FIG. 1*a* is a top view of an incubator block (1) and FIG. 1*b* a detailed cross section thereof. The top view of the incubator block has an essentially circular shape. The bores (2) in the incubator block and the bores (12) in the holding plate are arranged in four concentric circles. Holding plate (3) has essentially the form of a circular segment and is at its lower side provided with several legs (4*a*, 4*b*) which also serve to position the holding plate on the incubator block. The legs (4*a*) have an angular cross section which serves as a positioning aid together with the recesses (5) in the incubator block (1). Moreover, the holding plate has a leg (4*b*) which engages a circular recess (6) in the incubator block (1). FIG. 1*b* shows that the form of the incubating vessel (20) and the bore (2) in incubator block (1) are adjusted to one another such that the wall of the incubating vessel fits tightly with the inner side of bore (2) in order to ensure good heat transfer.

FIG. 2 is an enlarged representation of an incubating vessel (20). The incubating vessel (20) is one single piece, but can be described as comprising two segments. Segment (21) is conically tapered and closed at its bottom side. Segment (22) located above the holding plate (3) when the vessel is placed in the holding, has a cylindrical shape and is open toward the top. The transition between the two segments of the incubating vessel is of particular importance. Owing to the different outer diameters of said segments, a shoulder (23) with which the incubating vessel rests on the holding plate (3) forms therebetween. Shoulder (23) has a width between approx. 0.3 to 0.6 mm.

FIG. 3 is a lateral view of a rack (10) with an incubating vessel (20) placed therein and also shows free bores (12). Above the holding plate (3), there are two handles (11). Below the holding plate (3), the figure also shows legs (4*a*) and legs (4*b*).

FIG. 4*a* is a perspective view of an incubating system. A rack (10) is placed on the incubator block (1) such that the incubating vessel (20) immerses into the bores (2) of the incubator block. Legs (4*a*) are moved beyond the edge of recess (5) and leg (4*b*) engages recess (6). FIG. 4*a* also shows a light barrier (24) located inside the incubator block. The light barrier senses the presence of a rack in that a leg (4*b*) interrupts the light path at the lower end of recess (6). For clarity's sake, FIG. 4*b* gives a lateral view of this section. From the figures it can be seen that incubating vessel (20) is first placed into rack (10). If the incubating vessel is placed in a bore (2) of the incubator block (1) with the aid of the rack, the incubating vessel makes contact with the bottom of the bore of the incubator block. The length of the incubating vessel (20) is dimensioned such that there is formed a gap between shoulder (23) and the topside of the holding plate (3) if the latter rests on the incubator block. In FIG. 4*b* it can also be seen that the space between the end of the bore and the incubating vessel is enlarged when the incubating vessel is moved upwardly out of the holding plate.

| List of reference numerals | |
|---|---|
| (1) | Incubator block |
| (2) | Bore of incubator block |
| (3) | Holding plate |
| (4a, 4b) | Legs |
| (5) | Recess |
| (6) | Circular recess |
| (10) | Rack |
| (11) | Handles |
| (12) | Bore in holding plate |
| (20) | Incubating vessel |
| (21) | Lower portion of incubating vessel |
| (22) | Upper portion of incubating vessel |
| (23) | Shoulder |
| (24) | Light barrier |

We claim:

1. A system for incubating sample liquids, said system comprising:
   - holding means having a plurality of bores therein, said bores configured to receive incubating vessels therein, said incubating vessels including support elements which engage said holding means, and wherein said incubating vessels are supported by said support elements on said holding means;
   - an incubator block having a plurality of bores therein, said plurality of bores of said incubator block configured to correspond with said plurality of bores in said holding means, said plurality of incubating vessels being received in said plurality of bores in said incubator block, when the holding means is disposed on the incubator block;
   - thermal means coupled to said incubator block, said thermal means for controlling a temperature of the incubator block, wherein a first space is formed between the support elements and the holding means when the holding means is disposed on the incubator block when the incubating vessels contact a bottom of the bores of said incubator block, and wherein a second space exists between inner walls of the bores in the holding means and outer walls of the vessels when the vessels are lifted from the holding means, thereby preventing a jamming of the vessels and the bores in the incubator block.

2. A system for incubating sample fluids as recited in claim 1, wherein inner surfaces of each of the plurality of the bores in the incubator block are configured to correspond with outer surfaces of one of the plurality of incubating vessels whereby the outer surfaces of the incubating vessel contact the inner surfaces of a corresponding bore of the incubator block.

3. A system for incubating sample liquids as recited in claim 1, wherein a length of one of the incubating vessels disposed in the holding means extends below the holding means, said length being greater than a depth of a corresponding bore of the incubator block.

4. A system for incubating sample liquids as recited in claim 1, wherein said holding means further comprises support means at a bottom portion thereof, and wherein the incubator block includes corresponding recesses for receiving the support means.

5. A system for incubating sample liquids as recited in claim 4, wherein said support means comprises a plurality of legs, and said recesses are configured to receive the plurality of legs therein.

6. A system for incubating sample liquids as recited in claim 1, wherein said holding means further comprises handle means thereupon, said handle means for enabling handling of said holding means.

7. A system for incubating sample liquids as recited in claim 6, wherein said handle means comprises at least one handle for grasping the holding means, said at least one handle being disposed on an upper side of the holding means.

8. A system for incubating sample liquids as recited in claim 1, said system further comprising sensor means disposed within the incubator block, said sensor means for sensing a presence of the holding means on said incubator block.

9. A system for incubating sample liquids as recited in claim 1, wherein said holding means comprises a holding plate in a shape of a segment of a circle.

10. A system for incubating sample liquids as recited in claim 1, wherein said holding means comprises a holding plate having a plurality of bores therein, said holding plate having at least one leg on a bottom portion thereof, and wherein each of said incubating vessels include support elements on an exterior thereof which engage said holding plate wherein the incubating vessels are supported on the holding plates by the support elements.

11. A system for incubating sample liquids as recited in claim 10, wherein said at least one leg is longer than a portion of one of the plurality of incubating vessels which is disposed below the holding means.

12. System as recited in claim 1, wherein the incubating vessels are tapered whereby the second space is enlarged when the incubating vessels are lifted up from the holding means.

13. System as recited in claim 12, wherein the taper of the incubating vessels has a gradient of 0.05 to 0.5.

14. System as recited in claim 1, wherein each of said bores in said holding means has a diameter which is 0.2–1 mm larger than an outer diameter of an incubating vessel disposed therein.

* * * * *